United States Patent

Ikeda et al.

[11] Patent Number: 5,855,793
[45] Date of Patent: Jan. 5, 1999

[54] METHOD OF TREATING WASTE WATER TO REMOVE HARMFUL ION BY COAGULATING SEDIMENTATION

[75] Inventors: Kenichi Ikeda; Yuichi Asai; Yuji Arai, all of Kanagawa, Japan

[73] Assignee: NEC Corporation, Tokyo, Japan

[21] Appl. No.: 972,569

[22] Filed: Nov. 18, 1997

Related U.S. Application Data

[63] Continuation of Ser. No. 690,590, Jul. 31, 1996, Pat. No. 5,750,033.

[30] Foreign Application Priority Data

Apr. 19, 1996 [JP] Japan ..................................... 8-097248

[51] Int. Cl.⁶ ....................................................... C02F 1/62
[52] U.S. Cl. ........................... 210/711; 210/713; 210/717; 210/725; 210/727; 210/912; 210/114
[58] Field of Search ..................................... 210/711, 713, 210/717, 724, 725, 726, 727, 912, 914

[56] References Cited

U.S. PATENT DOCUMENTS

| | | | |
|---|---|---|---|
| 2,128,569 | 8/1938 | Velz | 210/711 |
| 3,284,350 | 11/1966 | Williamson | 210/915 |
| 3,377,271 | 4/1968 | Cann | 210/711 |
| 3,575,853 | 4/1971 | Gaughan et al. | 210/716 |
| 3,725,266 | 4/1973 | Haviland | 210/710 |
| 3,800,024 | 3/1974 | Forsell et al. | 210/710 |
| 4,028,237 | 6/1977 | Nishimura et al. | 423/305 |
| 4,279,756 | 7/1981 | Weiss et al. | 210/667 |
| 4,343,706 | 8/1982 | Etzel et al. | 210/667 |
| 5,043,072 | 8/1991 | Hitotsuyanagi et al. | 210/638 |
| 5,102,556 | 4/1992 | Wong | 210/711 |

FOREIGN PATENT DOCUMENTS

| | | |
|---|---|---|
| 49-31146 | 3/1974 | Japan . |
| 50-15357 | 2/1975 | Japan . |
| 55-35994 | 9/1980 | Japan . |
| 57-071692 | 5/1982 | Japan . |
| 58-13230 | 3/1983 | Japan . |
| 60-241988 | 11/1985 | Japan . |
| 1-107890 | 4/1989 | Japan . |
| 3-109994 | 5/1991 | Japan . |
| 4-100591 | 4/1992 | Japan . |

*Primary Examiner*—Peter A. Hruskoci
*Attorney, Agent, or Firm*—Young & Thompson

[57] ABSTRACT

The invention relates to the treatment of waste water containing a harmful ion such as a heavy metal ion or fluorine ion by the coagulating sedimentation method using an inorganic coagulant such as an iron compound or an aluminum compound. After separating treated water from the sediment (sludge) in which the harmful ion is incorporated in insoluble form, the pH of a mixture of the sediment and water is suitably adjusted to cause elution of the harmful ion from the sediment. Then the sediment is separated from the eluate and reused as an inorganic coagulant. By reusing the sediment in this manner, the waste water treatment is accomplished without producing a large quantity of sludge and the consumption of inorganic coagulant and auxiliary chemicals can be greatly reduced, while the concentration of the harmful ion in the treated water becomes sufficiently low.

8 Claims, 5 Drawing Sheets

METHOD OF TREATING WASTE WATER TO REMOVE HARMFUL ION BY COAGULATING SEDIMENTATION

This application is a continuation of application Ser. No. 08/690,590, filed Jul. 31, 1996 now U.S. Pat. No. 5,750,033.

BACKGROUND OF THE INVENTION

This invention relates to a method of treating waste water containing a harmful ion such as a heavy metal ion or fluorine ion to remove the harmful ion by coagulating sedimentation by using an inorganic coagulant such as an iron salt or an aluminum salt.

For the treatment of waste water containing a harmful ion such as a heavy metal ion or fluorine ion, a conventional method is the coagulating sedimentation method using an inorganic coagulant. That is, under an appropriate pH condition a coagulant such as an iron salt, aluminum salt or magnesium salt is added to the waste water to form a hydroxide sediment in which the harmful ion is incorporated by adsorption, coprecipitation and/or reaction with the coagulant, and then the sediment is separated from the treated water. In the case of waste water containing fluorine, another conventional method is the addition of a calcium compound to precipitate fluorine as calcium fluoride. A problem common to these conventional methods is that the hydroxide sediment or calcium fluoride precipitate becomes sludge which is large in quantity and high in water content and which is harmful waste.

To decrease the quantity of sludge produced by the treatment of waste water, there are some proposals of reusing a portion of the sludge as coagulant for treating waste water For example, JP-A 60-241988 relates to the treatment of waste water containing fluorine with a calcium compound and an inorganic coagulant such as aluminum sulfate and proposes to reuse at least a portion (e.g., 20 to 50%) of the sludge as part of the coagulant. However, in this method the coagulating capability of the fresh coagulant is adversely affected by fluorine existing in the reused sludge. Therefore, the efficiency of the treatment is lowered, and it is difficult to greatly decrease the quantity of produced sludge.

JP-B 58-13230 proposes to treat waste water containing fluorine by the steps of first removing most of fluorine as calcium fluoride precipitate, then forming magnesium hydroxide precipitate which incorporates therein the remaining fluorine, separating the composite precipitate from treated water, dissolving the separated precipitate in acidic water and recycling the obtained solution. JP-A 1-107890, which relates to the treatment of waste water containing boron and fluorine by the addition of a calcium compound and an aluminum compound, proposes to reuse aluminum in the sludge by eluting aluminum from the sludge separated from treated water and recycling the aluminum eluate. By these methods it is possible to decrease the quantity of produced sludge to some extent, but it is difficult to greatly decrease sludge because it is difficult to dissolve most of magnesium or aluminum in the sludge. Besides, a large quantity of acid or base is consumed to dissolve magnesium or aluminum.

SUMMARY OF THE INVENTION

It is an object of the present invention to provide an improved method for treating waste water containing a harmful ion such as a heavy metal ion or fluorine ion by coagulating sedimentation using an inorganic coagulant, which method can greatly decrease both the quantity of produced sludge and the consumption of the inorganic coagulant and auxiliary chemicals.

A method according to the invention is for treating waste water containing a harmful ion, and the method comprises the steps of (a) adjusting the pH of the waste water and adding an inorganic coagulant to the waste water to form a sediment in which the harmful ion is incorporated in insoluble form, (b) separating the sediment from treated water, (c) adjusting the pH of a mixture of the separated sediment and water to cause elution of the harmful ion from the sediment and separating the sediment from the eluate containing the harmful ion, and (d) reusing the sediment separated from the eluate as an inorganic coagulant for the treatment of the waste water.

In this invention the inorganic coagulant can be selected from conventional coagulants for treating waste water, such as compounds of trivalent iron, compounds of trivalent aluminum and compounds of divalent magnesium. In aqueous solutions at appropriate pH values these compounds form precipitates of hydroxides. Also it is possible to use an insoluble hydroxide of iron, aluminum or magnesium as the coagulant. In treating waste water containing fluorine, it is optional to add a calcium compound to the waste water in addition to the inorganic coagulant.

By agitation of a mixture of waste water and a hydroxide precipitate derived from the coagulant, the harmful ion in the waste water is incorporated into the hydroxide precipitate by adsorption, coprecipitation and/or chemical reaction. In the case of a heavy metal ion such as lead ion or cadmium ion, by appropriate control of pH an insoluble hydroxide of the heavy metal precipitates as fine particles, and these particles are efficiently captured by the hydroxide precipitate. When calcium ion is introduced into waste water containing fluorine ion, most of fluorine precipitates as fine particles of $CaF_2$ which are efficiently captured by the hydroxide precipitate. For each combination of the harmful ion and the inorganic coagulant, an optimal range of pH can be found by a simple experiment. For example, in treating waste water containing lead ion with an iron(III) salt a suitable range of pH is from 8 to 10, and preferably from 8.5 to 9.5. To remove fluorine ion with an aluminum salt a suitable range of pH is from 5.5 to 8, and preferably from 6.5 to 7.5.

After treating waste water with an inorganic coagulant, the hydroxide precipitate containing the harmful ion is separated from the treated water by a solid-liquid separation operation such as sedimentation, filtration or centrifugation. To ease the separation, it is optional to add a polymer coagulant such as polyacrylamide to the treated water before separating the precipitate.

The separated precipitate or sediment is mixed with water to obtain a slurry-like mixture of a suitable concentration, and the pH of the mixture is adjusted to a value optimal for elution of the harmful ion from the sediment by the addition of an acid such as sulfuric acid or a base such as sodium hydroxide. The optimal pH value depends on the combination of the harmful ion and the inorganic coagulant and also on the condition for the formation of the hydroxide precipitate. For example, when waste water containing lead ion is treated with an iron(III) salt, it is suitable to perform the elution of lead ion from the sediment at a pH in the range from 3 to 6 (preferably from 3.5 to 5) or in the range from 11 to 12. For the elution of fluorine ion from aluminum hydroxide sediment, a pH value in the range from 3.5 to 5.5 (preferably from 4 to 5) or in the range from 9 to 11.5 (preferably from 9.5 to 11.0) is suitable.

By the elution of the harmful ion the hydroxide sediment restores its coagulating or adsorbing capability. It is not necessary to completely remove the harmful ion from the sediment. To enhance the efficiency of the elution, it is permissible to partly dissolve the hydroxide sediment by suitable adjustment of the pH condition.

After eluting the harmful ion from the sediment, the sediment is separated from the eluate containing the harmful ion by a solid-liquid separation operation such as sedimentation, filtration or centrifugation. To ease the separation, a polymer coagulant may be added to the mixture of the sediment and the eluate. When two or more kinds of harmful ions are incorporated in the hydroxide sediment, the elution and solid-liquid separation operations may be carried out in plural stages under different pH conditions for the respective harmful ions.

The sediment separated from the eluate is repeatedly reused as inorganic coagulant. According to the need, a fresh coagulant may be supplementary added to the treatment system, but in most cases this is unnecessary.

The principal feature of the invention is reusing the sludge produced by a coagulating sedimentation method as inorganic coagulant after eluting the harmful ion from the sludge. By this method the treatment of waste water can be accomplished without producing a large quantity of sludge since the sludge is mostly reused after restoring coagulating capability. Furthermore, the consumption of the inorganic coagulant greatly decreases since there is little need of supplementing the reused sludge with a fresh coagulant. Besides, the regeneration of the sludge does not consume large quantities of auxiliary chemicals (acid and/or base) since only the harmful ion is eluted.

In the case of treating waste water having a very high content of harmful ion, the waste water may be first treated by a conventional treatment system to appropriately lower the content of harmful ion. Then the partly treated waste water can be efficiently and thoroughly treated by a small-scale treatment system according to the invention. The eluate of harmful ion produced in a treatment system according to the invention may be treated in a separate treatment system of coagulating sedimentation type, or may be treated by a different method such as evaporation or ion exchange.

DESCRIPTION OF THE PREFERRED EMBODIMENTS

EXAMPLE 1

Aluminum sulfate containing 5 g of Al was dissolved in 10 liters of water, and, stirring the solution, a NaOH solution was added to adjust the pH of the solution to 6.5 and to cause precipitation of aluminum hydroxide. Next, sodium fluoride was dissolved in the water containing the precipitate until the fluorine concentration in the water became 200 mg/l. Then the pH of the mixture was again adjusted to 6.5 by the addition of a NaOH solution, and stirring was continued for 30 min. Next, 10 mg of a polymer coagulant (a polyacrylamide base coagulant), and the mixture was further stirred for 5 min. After that the mixture was left standing for 4 h to allow sedimentation of solid matter. Then a supernatant liquid of the mixture was removed to leave a slurry sediment, which consisted mostly of aluminum hydroxide and contained fluorine. Using this sediment, the following tests were carried out.

1. Elution Test

Figure 1:
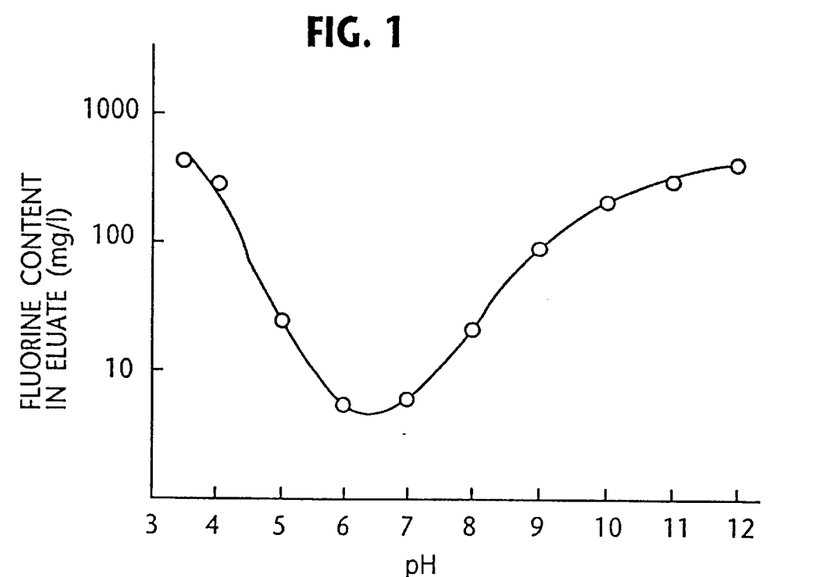
FIG. 1 is a graph showing the dependence of the efficiency of elution of fluorine from an aluminum hydroxide sediment on the pH of an aqueous slurry of the sediment in an example of the invention.

Several samples of the slurry sediment were taken to test the elution of fluorine from the sediment under various pH conditions. Each sample was 100 ml in volume. The pH of each sample was adjusted to an aimed value by the addition of a sulfuric acid solution or a sodium hydroxide solution, and the volume of every sample was adjusted to 150 ml by the addition of water. After stirring for 30 min, each sample was left standing for 4 h. Then a supernatant liquid of each sample was filtered with No. 5A filter paper, and the concentration of fluorine in the filtrate was measured by the ion selective electrode method according to JIS K 0102. The results are shown in FIG. 1. In FIG. 1 it is seen that both acidic conditions below 6 in pH value and basic conditions above 7 in pH value are favorable for the elution of fluorine from the slurry sediment.

However, consideration should be given to the dissociation of aluminum hydroxide. Under acidic conditions, with respect to dissociation equilibrium (1):

$$Al(OH)_3(s) \rightleftharpoons Al^{3+} + 3OH^- \quad (1)$$

the solubility product $K_{sp}$ of aluminum hydroxide is $1.92 \times 10^{-32}$. When the pH of the equilibrium system is below 4, the dissolution of the aluminum salt as $Al^{3+}$ becomes considerable. Therefore, it is practically rather undesirable to perform the elution of fluorine from the sediment under such strongly acidic conditions.

Under basic conditions, with respect to dissociation equilibrium (2):

$$Al(OH)_3(s) \rightleftharpoons AlO_2^- + H_3O^+ \quad (2)$$

the acid dissociation constant $K_a$ of aluminum hydroxide is $4 \times 10^{-13}$. When the pH of the equilibrium system is above 11 the dissolution of the aluminum salt as $AlO_2^-$ becomes considerable. Therefore, it is practically rather undesirable to perform the elution of fluorine under such strongly basic conditions. Taking into consideration the consumption of acid or base, the most preferable range of the pH to perform the elution of fluorine from the aluminum hydroxide sediment is from 4.0 to 5.0 or from 9.5 to 11.0.

2. Reuse Test

Figure 2:
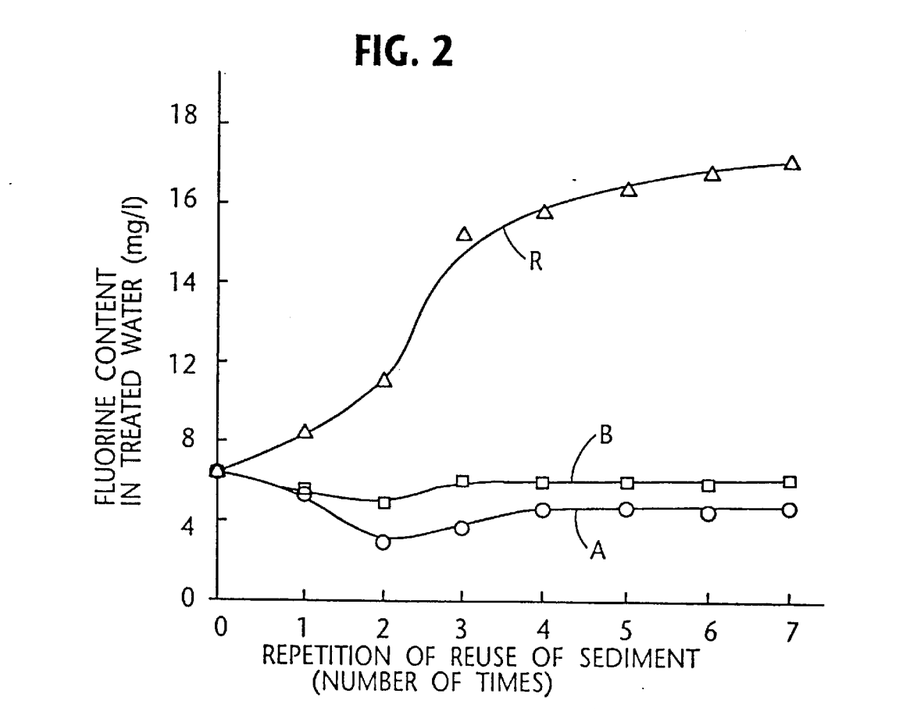
FIG. 2 is a graph showing the effects of repeated reuse of the aluminum hydroxide sediment as coagulant on the fluorine content in treated water in the example of the invention and in a comparative example.

Separately from the above described elution test, the slurry sediment was reused in the following way. A sulfuric acid solution and water were added to 100 ml of the slurry sediment to adjust the pH to 4.0 and the volume to 150 ml, and the slurry was stirred for 30 min. Next, the polymer coagulant mentioned above was added in the proportion of 1 mg/l, followed by stirring for 5 min. After that the slurry was left standing for 4 h to settle solid matter Then a supernatant liquid was removed to leave a sediment. This sediment was mixed with 400 ml of a sodium fluoride solution containing 25 mg/l of fluorine, and the pH of the mixture was adjusted to 6.5 by the addition of a NaOH solution. After stirring the mixture for 30 min, the polymer coagulant was added in the proportion of 1 mg/l, followed by stirring for 5 min After that the mixture was left standing for 4 h to allow sedimentation of solid matter. Then, the supernatant liquid was filtered with No. 5A filter paper, and the concentration of fluorine in the filtrate was measured. From the sediment in the state of aqueous slurry, fluorine was eluted by adjusting the pH to 4.0 with sulfuric acid. Then the sediment was separated from the fluorine eluate and reused for the treatment of the sodium fluoride solution containing 25 mg/l of fluorine in the above described manner. The reuse of the sediment was repeated seven times. The results are shown in FIG. 2 by the curve A That is, the sediment separated from the fluorine eluate could be repeatedly reused as coagulant for treatment of fluorine-containing water, and every time the fluorine concentration in the treated water could be decreased to less than 6 mg/l from the initial concentration of 25 mg/l.

When the elution of fluorine from the sediment was performed at a pH of 5.5, the sediment separated from the eluate was relatively low in the activity as coagulant so that the efficiency of the removal of fluorine from the fluoride solution became lower.

EXAMPLE 1A

The reuse test in Example 1 was modified only in the following points. In this case, the elution of fluorine from the slurry sediment was performed at a pH of 10.0, using a NaOH solution to adjust pH. For the treatment of the sodium fluoride solution with the sediment separated from the fluorine eluate, a sulfuric acid solution was used to adjust the pH of the mixture of the solution and the sediment to 6.5.

The results of the reuse test in Example 1A are shown in FIG. 2 by the curve B. That is, while the sediment separated from the fluorine eluate was repeatedly reused as coagulant up to seven times, the fluorine concentration in the treated water could be decreased to less than 7 mg/l from the initial concentration of 25 mg/l.

When the elution of fluorine from the sediment was performed at a pH of 9.0, the sediment separated from the eluate was relatively low in the activity as coagulant so that the efficiency of the removal of fluorine from the fluoride solution became lower.

COMPARATIVE EXAMAPLE 1

The reuse test in Example 1 was modified by omitting the elution of fluorine from the sediment. The results are shown in FIG. 2 by the curve R. That is, there was a gradual increase in the concentration of fluorine in the treated water, and the fluorine concentration became above 15 mg/l when the sediment was reused three times or more. In other words, the efficiency of the removal of fluorine from the fluoride solution gradually lowered because of accumulation of fluorine in the reused sediment.

EXAMPLE 2

Sodium fluoride was dissolved in water to obtain an aqueous solution containing 400 mg/l of fluorine. An aqueous solution of calcium chloride was added to the fluoride solution to obtain a mixed solution containing 420 mg/l of calcium, and the pH of the mixed solution was adjusted to 7 with a NaOH solution. The mixed solution was stirred for 30 min to allow precipitation of calcium fluoride. Next, aluminum sulfate was added to make a mixture containing 500 mg/l of aluminum, and the pH of the mixture was again adjusted to 7 with a NaOH solution. The mixture was stirred for 30 min Next, the polymer coagulant mentioned above was added in the proportion of 1 mg/l, and the mixture was further stirred for 5 min. After that the mixture was left standing for 4 h to allow sedimentation of solid matter. Then a supernatant liquid of the mixture was removed to leave a slurry sediment containing fluorine. Using this sediment, the following tests were carried out.

1. Elution Test

The test procedure was identical with the elution test procedure in Example 1.

Figure 3:
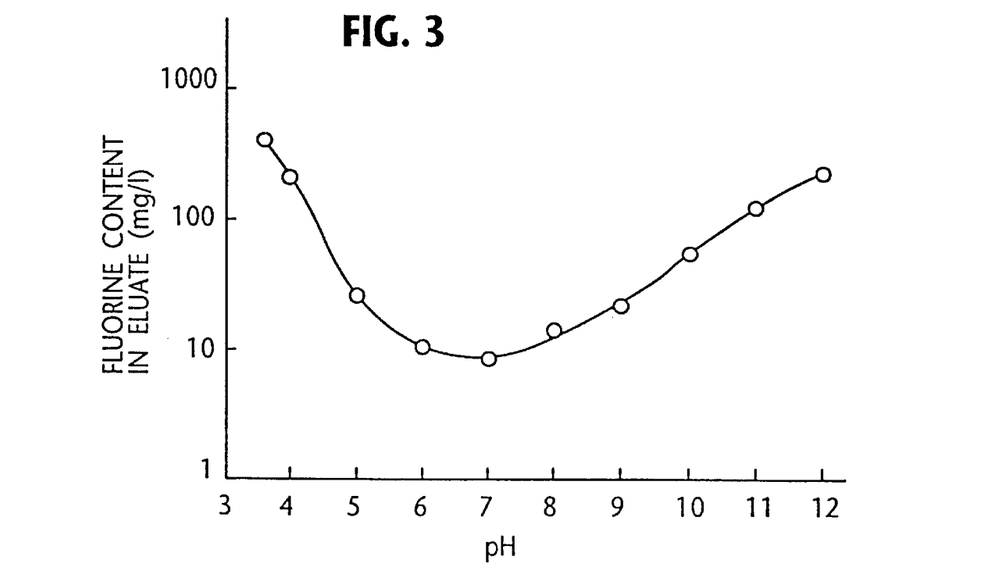
FIGS. 3 and 4 correspond to FIGS. 1 and 2, respectively, but show the results of a different example.

The results are shown in FIG. 3. It is seen that both acidic conditions below 6 in pH value and basic conditions above 7 in pH value are favorable for the elution of fluorine from the slurry sediment. For the elution the most preferable ranges of pH are as described in Example 1.

2. Reuse Test

This test was generally similar to the reuse test in Example 1, but some changes were made.

Figure 4:
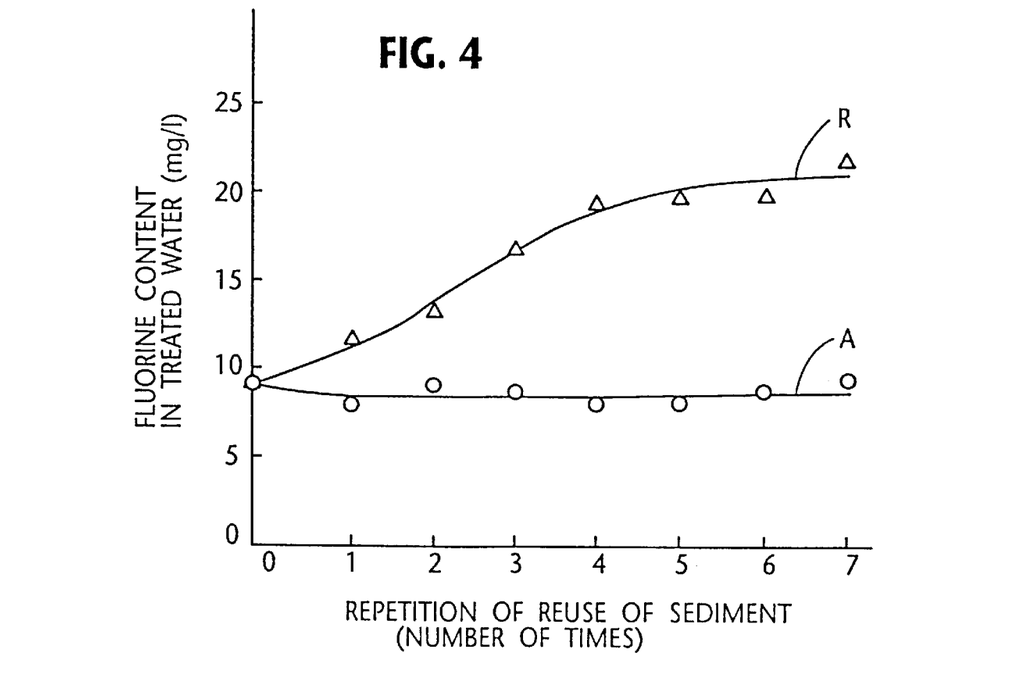

A sulfuric acid solution and water were added to 100 ml of the slurry sediment to adjust the pH to 4.5 and the volume to 150 ml, and the slurry was stirred for 30 min. Next, the polymer coagulant was added in the proportion of 1 mg/l. and stirring was made for 5 min After that the slurry was left standing for 4 h to settle solid matter. Then a supernatant liquid was removed to leave a sediment. This sediment was mixed with 400 ml of a sodium fluoride solution containing 25 mg/l of fluorine, and calcium chloride was added to obtain a mixture containing 25 mg/l of calcium, and the pH of the mixture was adjusted to 7.0 with a NaOH solution. After stirring the mixture for 30 min, the polymer coagulant was added in the proportion of 1 mg/l, followed by stirring for 5 min. After that the mixture was left standing for 4 h to allow sedimentation of solid matter. Then, the supernatant liquid was filtered with No. 5A filter paper, and the concentration of fluorine in the filtrate was measured. From the sediment in the state of slurry, fluorine was eluted by adjusting the pH to 4.5 with a sulfuric acid solution. Then the sediment was separated from the fluorine eluate and reused for the treatment of the sodium fluoride solution containing 25 ml/g of fluorine in the above described manner. The reuse of the sediment was repeated seven times. The results are shown in FIG. 4 by the curve A. That is, while the sediment separated from the fluorine eluate was repeatedly reused as coagulant up to seven times, the fluorine concentration in the treated water could be decreased to less than 10 mg/l from the initial concentration of 25 mg/l.

COMPARATIVE EXAMPLE 2

The reuse test in Example 2 was modified by omitting the elution of fluorine from the sediment. The results are shown in FIG. 4 by the curve R. It is apparent that the fluorine capturing capability of the repeatedly reused sediment gradually lowered by the accumulation of fluorine in the sediment.

EXAMPLE 3

Lead nitrate was dissolved in 10 liters of water to obtain a solution containing 500 mg/l of lead Iron(III) chloride was added to the solution, with stirring for 5 min, to obtain a mixed solution containing 400 mg/l of iron, and the pH of the mixed solution was adjusted to 9 with a NaOH solution. The mixed solution was stirred for 30 min to allow precipitation of an iron hydroxide together with a lead hydroxide. Next, a polymer coagulant (a polyacrylamide base coagulant) was added in the proportion of 1 mg/l, and the mixture was further stirred for 5 min. After that the mixture was left standing for 4 h to allow sedimentation of solid matter. Then a supernatant liquid of the mixture was removed to leave a slurry sediment containing lead. Using this sediment, the following tests were carried out.

1. Elution Test

The test procedure was generally similar to the elution test procedure in Example 1, except that the filtrate of the eluate was subjected to the measurement of the concentration of lead by the atomic absorption spectrometry according to JIS K 0102.

Figure 5:
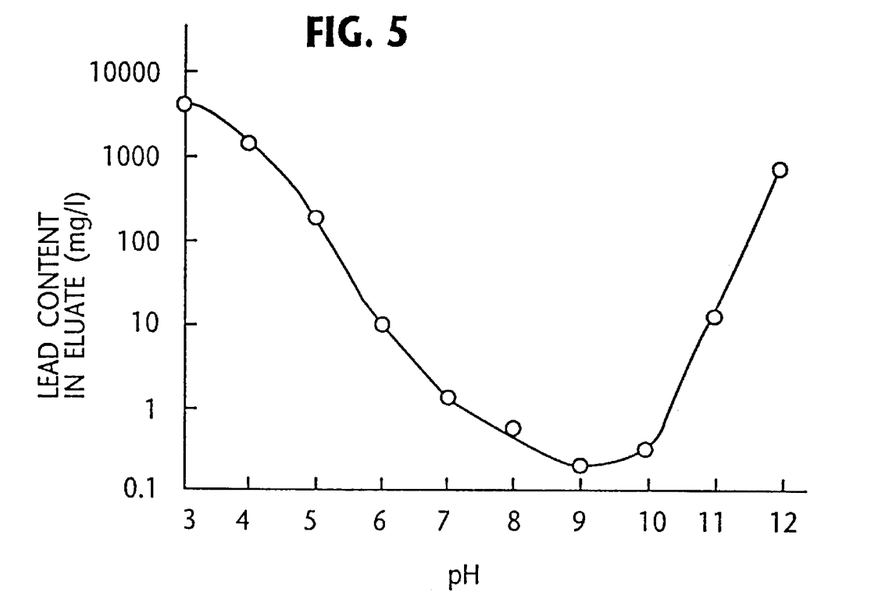
FIG. 5 shows the dependence of the efficiency of elution of lead from an iron hydroxide sediment on the pH of an aqueous slurry of the sediment in an example of the invention.

The results are shown in FIG. 5. It is seen that both acidic conditions below about 6 in pH value and basic conditions above about 11 in pH value are favorable for the elution of lead from the iron hydroxide sediment.

2. Reuse Test

The test procedure was fundamentally analogous to the test procedure in Example 1.

Figure 6:
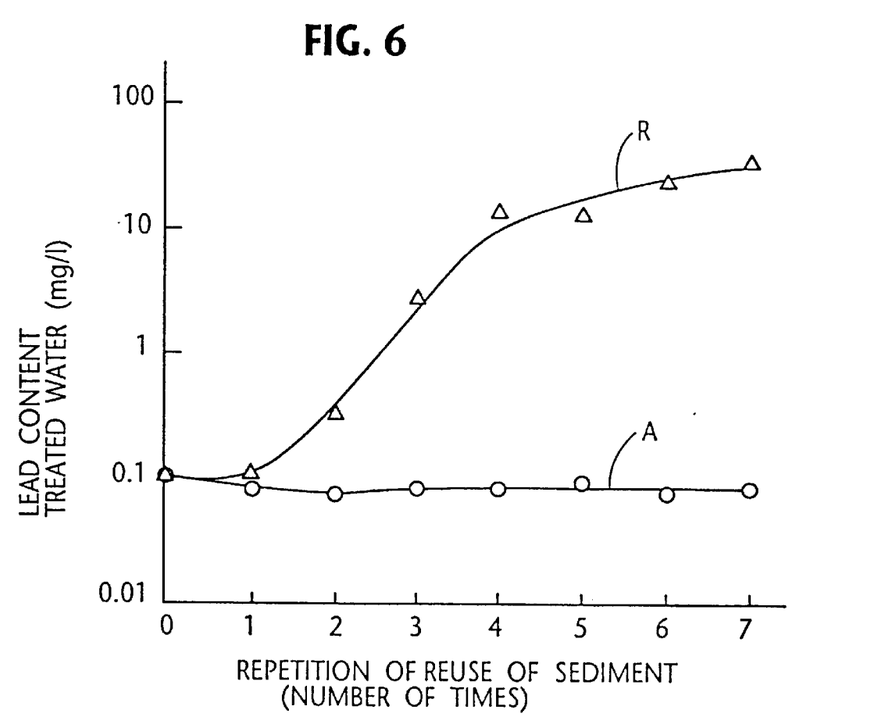
FIG. 6 shows the effects of repeated reuse of the iron hydroxide sediment on the lead content in treated water in the example of the invention and in a comparative example.

A sulfuric acid solution and water were added to 100 ml of the slurry sediment containing lead to adjust the pH to 4.0 and the volume to 150 ml, and the slurry was stirred for 30 min Next, the polymer coagulant was added in the proportion of 1 mg/l, and stirring was made for 5 min. After that the slurry was left standing for 4 h to settle solid matter. Then a supernatant liquid was removed to leave a sediment. This sediment was mixed with 800 ml of a lead nitrate solution containing 100 mg/l of lead, and the pH of the mixture was adjusted to 9.0 with a NaOH solution After stirring the mixture for 30 min, the polymer coagulant was added in the proportion of 1 mg/l, followed by stirring for 5 min. After that the mixture was left standing for 4 h to allow sedimentation of solid matter. Then, the supernatant liquid was filtered with No. 5A filter paper, and the concentration of lead in the filtrate was measured. From the sediment in the state of aqueous slurry, lead was eluted by adjusting the pH to 4.0 with a sulfuric acid solution. Then the sediment was separated from the lead eluate and reused for the treatment of the lead nitrate solution containing 100 mg/l of lead in the above described manner The reuse of the sediment was repeated seven times The results are shown in FIG. 6 by the curve A. That is, while the sediment separated from the lead eluate was repeatedly reused as coagulant up to seven times, the lead concentration in the treated water could be decreased to less than 0.1 mg/l from the initial concentration of 100 mg/l.

COMPARATIVE EXAMPLE 3

The reuse test in Example 3 was modified by omitting the elution of lead from the sediment. The results are shown in FIG. 6 by the curve R. It is apparent that the lead capturing capability of the repeatedly reused sediment gradually and greatly lowered.

EXAMPLE 3A

Cadmium-containing water was treated by fundamentally the same method as in Example 3. The pH of a mixture of the cadmium-containing water and an iron(III) chloride solution was adjusted to 10 to cause precipitation of hydroxides of iron and cadmium. After sedimentation, cadmium was eluted from the sediment at a pH of 4. The sediment was separated from the eluate and reused as coagulant for treatment of a next batch of cadmium-containing water. This procedure was repeated with success in steadily and efficiently removing cadmium from water under treatment.

In analogous manners, still different heavy metals such as copper, arsenic, antimony, selenium and/or mercury can be efficiently removed from waste water by performing the treatment of the waste water with an iron(III) salt and the elution of the heavy metal from the sediment at suitably selected pH values, respectively, and by repeatedly reusing the sediment separated from the eluate.

EXAMPLE 4

Figure 7:
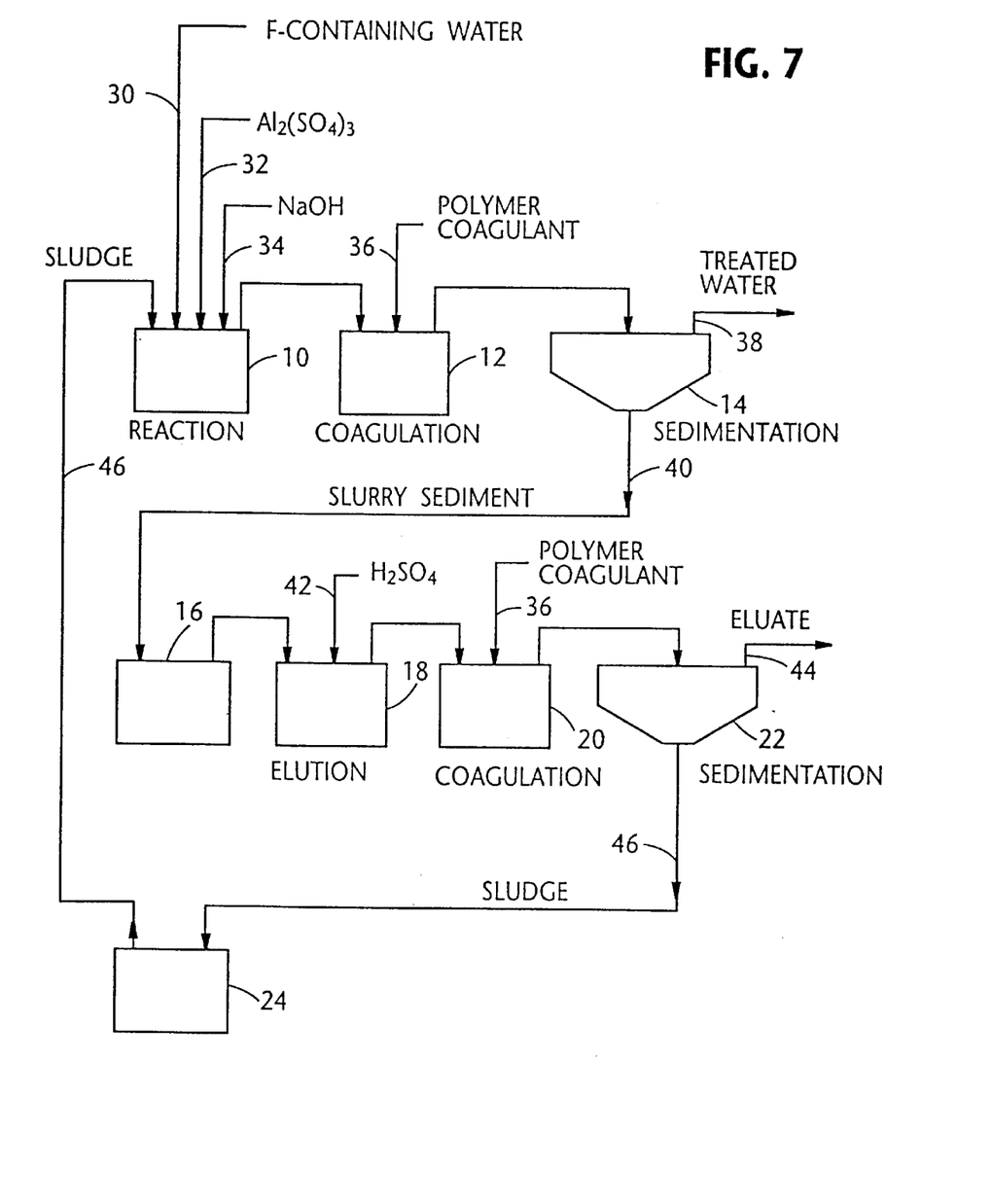
FIG. 7 is a flow diagram of a waste water treatment system in an example of the invention.

This example relates to a continuous treatment of fluorine-containing water by using an aluminum salt as inorganic coagulant. FIG. 7 is a flow diagram of the continuous treatment.

At the start of the treatment operation, aluminum sulfate 32 was introduced into a reaction tank 10 to keep a suitable quantity of aluminum hydroxide sediment in the treatment system. Fluorine-containing water 30 was continuously introduced into the reaction tank 10 at a rate of 1 l/h, and an aqueous slurry of aluminum hydroxide sludge 46 was continuously returned from a holding tank 24 into the reaction tank 10 at a rate of 0.1 l/h. The pH of the mixture in the reaction tank 10 was kept at 7 by the addition of 20% NaOH solution 34, and the mixture was stirred to undergo reaction. The residence time of the reactants was controlled to about 30 min.

In a first coagulation tank 12, a polymer coagulant 36 was added to the mixture flowed from the reaction tank 10 in the proportion of 5 mg/l, and the mixture was stirred for 10 min to form a floc of coagulated precipitates. Next, in a first sedimentation tank 14 the flock was settled to separate the mixture into treated water 38 and a slurry of a fluorine-containing sediment 40. The treated water 38 was flowed out of the tank 14 and periodically subjected to the measurement of the concentration of fluorine.

From the sedimentation tank 14 the slurry sediment 40 was passed to an elution tank 18 via a holding tank 16 where the water content of the slurry sediment was increased. In the elution tank 18 the pH of the slurry sediment was lowered to 4.2 by the addition of 20% sulfuric acid solution 42, and the mixture was stirred for 1 h to elute fluorine ion from the sediment. Next, in a second coagulation tank 20 a polymer coagulant was added to the mixture passed from the elution tank 18 in the proportion of 5 mg/l, and the mixture was stirred for 10 min to form a flock of coagulated sediment. Then, in a second sedimentation tank 22 the floc was settled to separate the mixture into an eluate 44 containing fluorine in a high concentration and a sludge 46. The eluate 44 was taken out of the tank 22 at a rate of 0.07 l/h and periodically subjected to the measurement of the concentration of fluorine The sludge 46 was passed to a holding tank 24 where the water content of the sludge was suitably adjusted. After that, the sludge 46 in the state of slurry was delivered into the reaction tank 10 in order to recycle the sludge as an inorganic coagulant.

Figure 8:
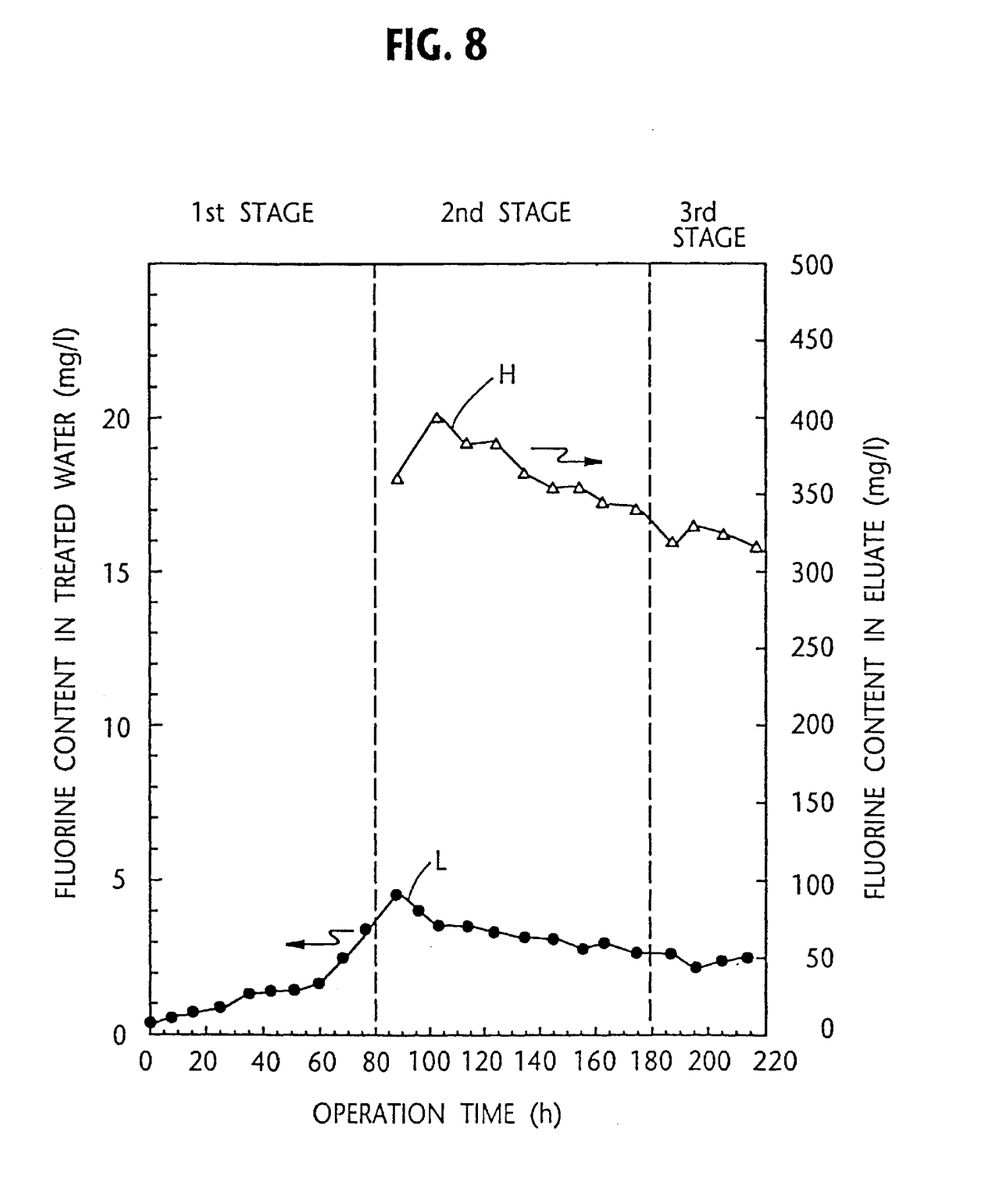
FIG. 8 is a chart showing the results of the operation of the system of FIG. 7.

FIG. 8 shows the results of the continuous operation of the system of FIG. 7 in Example 4. In FIG. 8 the curve L represents changes in the concentration of fluorine in the treated water 38, and the curve H represents changes in the concentration of fluorine in the eluate 44.

The operation was divided into three stages. In the initial stage which lasted 80 h, the fluorine-containing water 30 was an aqueous solution of sodium fluoride containing 25 mg/l of fluorine. In this stage no acid was introduced into the elution tank 18, so that the pH of the slurry sediment 40 in the tank 18 was 7 (the same pH value as in the reaction tank 10). That is, the sediment was recycled without performing elution of fluorine. For this reason, the fluorine concentration in the treated water 38 gradually rose, as shown by the curve L, up to nearly 5 mg/l.

In the second stage which lasted 100 hr, the fluorine-containing water 30 was the same as in the initial stage, and the pH of the mixture in the elution tank 18 was adjusted to 4.2 to carry out the elution of fluorine from the sediment. Consequently, as shown by the curve L, the fluorine concentration in the treated water 38 gradually lowered from the relatively high value at the end of the initial stage to 4 to 3 mg/l. As shown by the curve H, the fluorine concentration in the eluate 44 varied within the range of from about 400 mg/l to about 330 mg/l.

In the third stage which lasted 35 h, the fluorine-containing water 30 was derived from waste water from the fabrication of a semiconductor. Initially the waste water was very high in the concentration of fluorine. The waste water was treated with a calcium salt to precipitate fluorine as calcium fluoride, and the precipitate was separated from the treated water by sedimentation. The treated water was used as the fluorine-containing water 35, which contained 23 mg/l of fluorine and 460 mg/l of calcium. In the third stage the pH of the mixture in the elution tank 18 was adjusted to 4.2. In the treated water 38 the fluorine concentration was 2 to 3 mg/l, and in the eluate 44 the fluorine concentration was 310 to 330 mg/l.

In course of the third stage operation, viz. after a lapse of 20 h from the start of the third stage (200 h from the start of the initial stage), the eluate 44 (which contained 320 mg of fluorine) was subjected to a test treatment. Using calcium chloride, 600 mg/l of calcium was introduced into the eluate, and the pH of the eluate was adjusted to 7.0 with a NaOH solution. After stirring for 30 min to precipitate calcium fluoride, a polymer coagulant was added (1 mg/l), followed by further stirring for 5 min. After that the mixture was left standing for 4 h. Then, in the supernatant water the fluorine concentration was only 15 mg/l.

In the three-stage operation shown in FIG. 8 (215 h in total), the mass ratio of the total quantity of fluorine in the fluorine-containing water flowed into the treatment system to the quantity of aluminum initially introduced into and recycled in the system was 0.43. The three-stage operation was performed without supplementary feed of aluminum salt into the system.

In the eluate 44, the form of dissolved fluorine is not clear, but presumably most of dissolved fluorine is in the form of aluminum fluoride ion represented by $AlF_n^{3-}$ (n is from 1 to 6).

In the fluorine-containing water treatment operation of Example 4, the quantity of sludge (per unit quantity of treated water) was less than ⅓ of that in the conventional treatment operation simply using aluminum sulphate as inorganic coagulant.

What is claimed is:

1. A method of treating waste water containing a heavy metal ion selected from the group consisting of copper, arsenic, antimony, selenium, mercury, cadmium and lead, comprising the steps of:

(a) adjusting the pH of the waste water and adding an inorganic coagulant to the waste water to form a hydroxide sediment which takes in the heavy metal ion in insoluble form;

(b) adding a polymer coagulant to the water treated with the inorganic coagulant;

(c) separating said hydroxide sediment from treated water;

(d) adjusting the pH of a mixture of the separated sediment and water to cause elution of the heavy metal ion from the sediment, adding a polymer coagulant, and separating the sediment from the eluate containing the heavy metal ion; and (e) reusing the sediment separated from said eluate as said hydroxide sediment in step (a).

2. A method according to claim 1, wherein said inorganic coagulant is an iron compound.

3. A method according to claim 2, wherein said iron compound is a compound of trivalent iron.

4. A method according to claim 3, wherein the heavy metal ion is lead ion, the pH of said mixture of the sediment and water being adjusted to a value in the range from 3 to 6 or in the range from 11 to 12 for elution of lead from the sediment.

5. A method according to claim 1, wherein the polymer coagulant added to the water treated with said inorganic coagulant before separating the sediment from the treated water comprises polyacrylamide.

6. A method according to claim 1, wherein the polymer coagulant added to said eluate before separating the sediment from the eluate comprises polyacrylamide.

7. A method according to claim 1, wherein the heavy metal ion is cadmium.

8. A method according to claim 1, wherein the heavy metal ion is lead.

* * * * *